(12) United States Patent
Kim

(10) Patent No.: US 9,435,940 B2
(45) Date of Patent: Sep. 6, 2016

(54) LIQUID CRYSTAL DISPLAY APPARATUS

(75) Inventor: Young-il Kim, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 370 days.

(21) Appl. No.: 12/105,078

(22) Filed: Apr. 17, 2008

(65) Prior Publication Data

US 2008/0266483 A1 Oct. 30, 2008

Related U.S. Application Data

(63) Continuation of application No. 11/430,568, filed on May 9, 2006, now Pat. No. 7,375,775, which is a continuation of application No. 11/019,010, filed on Dec. 21, 2004, now Pat. No. 7,068,331, which is a continuation of application No. 10/286,654, filed on Nov. 1, 2002, now Pat. No. 6,847,417.

(30) Foreign Application Priority Data

Mar. 8, 2002 (KR) .............................. 2002-0012519

(51) Int. Cl.
*G02F 1/1333* (2006.01)
*G02F 1/1335* (2006.01)
*F21V 8/00* (2006.01)

(52) U.S. Cl.
CPC ....... *G02B 6/0088* (2013.01); *G02F 1/133308* (2013.01); *G02F 1/133615* (2013.01); *G02B 6/009* (2013.01); *G02F 2001/133314* (2013.01);
(Continued)

(58) Field of Classification Search
CPC G02B 6/0011; G02B 6/0081; G02B 6/0086; G02B 6/0088; G02B 6/009; G02F 1/133308; G02F 1/133615; G02F 2001/133314; G02F 2001/133322; G02F 2201/46; G02F 2201/465
USPC .............. 349/58–65, 149–152; 362/600–632
See application file for complete search history.

(56) References Cited

U.S. PATENT DOCUMENTS 5,146,354 A * 9/1992 Plesinger ........................ 349/59
5,280,372 A * 1/1994 Horiuchi ......................... 349/65
(Continued)

FOREIGN PATENT DOCUMENTS

JP 62-110980 U 7/1987
JP 1993-069734 U 9/1993
(Continued)

*Primary Examiner* — Edward Glick
*Assistant Examiner* — David Chung
(74) *Attorney, Agent, or Firm* — Cantor Colburn LLP

(57) ABSTRACT

Disclosed is an LCD apparatus having a reduced size and weight. The LCD apparatus includes a bottom chassis having a bottom surface and first to fourth sidewalls. The sidewall of the bottom chassis includes a supporting member for preventing a light guiding plate from being moved and a fixing boss for fixing an optical sheet. The bottom chassis includes a lamp insertion portion for receiving a lamp unit, which is disposed on the third and fourth sidewalls of the bottom chassis. The bottom chassis receives a reflecting plate, the light guiding plate and the optical sheet. A mold frame is coupled to the bottom chassis to fix the reflecting plate, the light guiding plate and the optical sheet to the bottom chassis. A display unit disposed on the mold frame is fixed to the mold frame by a top chassis coupled to the mold frame. Accordingly, a bottom mold frame for receiving a backlight assembly is removed, so that it is able to reduce a cost of the LCD apparatus and a weight thereof.

39 Claims, 19 Drawing Sheets

(52) U.S. Cl.
CPC .............. *G02F 2001/133322* (2013.01); *G02F 2201/465* (2013.01)

(56) References Cited

U.S. PATENT DOCUMENTS

| | | | |
|---|---|---|---|
| 5,335,100 A * | 8/1994 | Obata | 349/65 |
| 5,504,605 A | 4/1996 | Sakuma et al. | |
| 5,748,269 A * | 5/1998 | Harris et al. | 349/58 |
| 6,034,751 A * | 3/2000 | Kamiya | G02F 1/133308 349/58 |
| 6,175,396 B1 * | 1/2001 | Kim et al. | 349/58 |
| 6,219,116 B1 * | 4/2001 | Yuuki | G02F 1/133308 349/58 |
| 6,292,239 B1 | 9/2001 | Nagamura et al. | |
| 6,330,150 B1 | 12/2001 | Kim | |
| 6,490,015 B1 * | 12/2002 | Kim | 349/58 |
| 6,512,557 B1 * | 1/2003 | Miwa | 349/58 |
| 6,532,152 B1 * | 3/2003 | White et al. | 361/692 |
| 6,549,263 B1 * | 4/2003 | Kim | G02F 1/133308 349/58 |
| 6,561,664 B2 * | 5/2003 | Yachi et al. | 362/615 |
| 6,593,979 B1 | 7/2003 | Ha et al. | |
| 6,595,651 B2 * | 7/2003 | Jeong et al. | 362/600 |
| 6,626,550 B2 * | 9/2003 | Choi | 362/632 |
| 6,667,780 B2 | 12/2003 | Cho | |
| 6,828,721 B2 * | 12/2004 | Wakita | 313/491 |
| 6,847,417 B2 * | 1/2005 | Kim | G02B 6/0088 349/58 |
| 6,854,856 B2 | 2/2005 | Shin et al. | |
| 6,950,154 B2 * | 9/2005 | Lee | G02B 6/0088 349/58 |
| 7,068,331 B2 * | 6/2006 | Kim | G02B 6/0088 349/58 |
| 7,106,393 B2 * | 9/2006 | Lee | G02B 6/0088 349/58 |
| 7,375,775 B2 * | 5/2008 | Kim | G02B 6/0088 349/58 |
| 2001/0050731 A1 * | 12/2001 | An et al. | 349/58 |

FOREIGN PATENT DOCUMENTS

| | | |
|---|---|---|
| JP | 09-147618 A | 6/1997 |
| JP | 09-197383 A | 7/1997 |
| JP | 10-098275 A | 4/1998 |
| JP | 10-232385 A | 9/1998 |
| JP | 10-268272 A | 10/1998 |
| JP | 11-052368 A | 2/1999 |
| JP | 11-084351 A | 3/1999 |
| JP | 11-202329 A | 7/1999 |
| JP | 11-281966 A | 10/1999 |
| JP | 2001035235 A | 2/2001 |
| JP | 2001-067013 A | 3/2001 |
| JP | 2001-109390 A | 4/2001 |
| JP | 2001-142054 A | 5/2001 |
| JP | 2002-006142 A | 1/2002 |
| JP | 2002-040959 A | 2/2002 |

\* cited by examiner

332

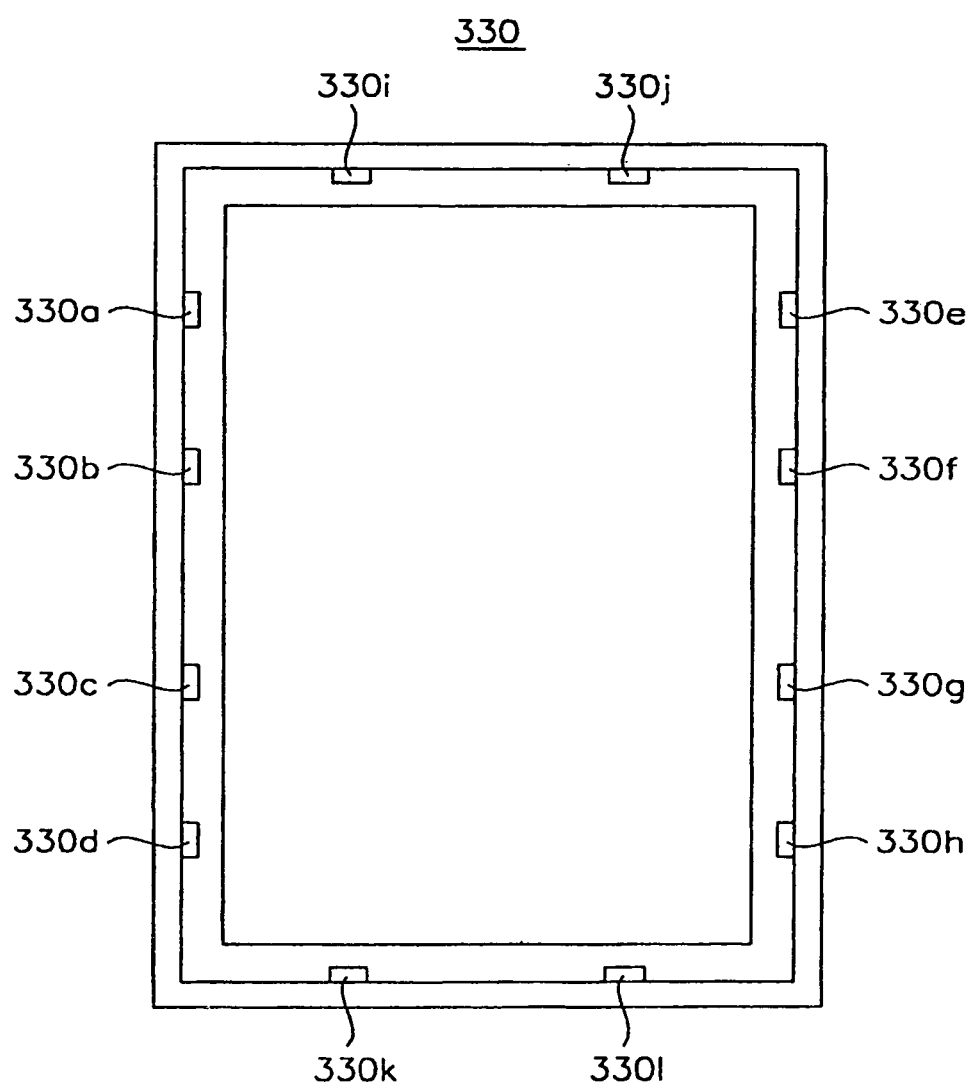

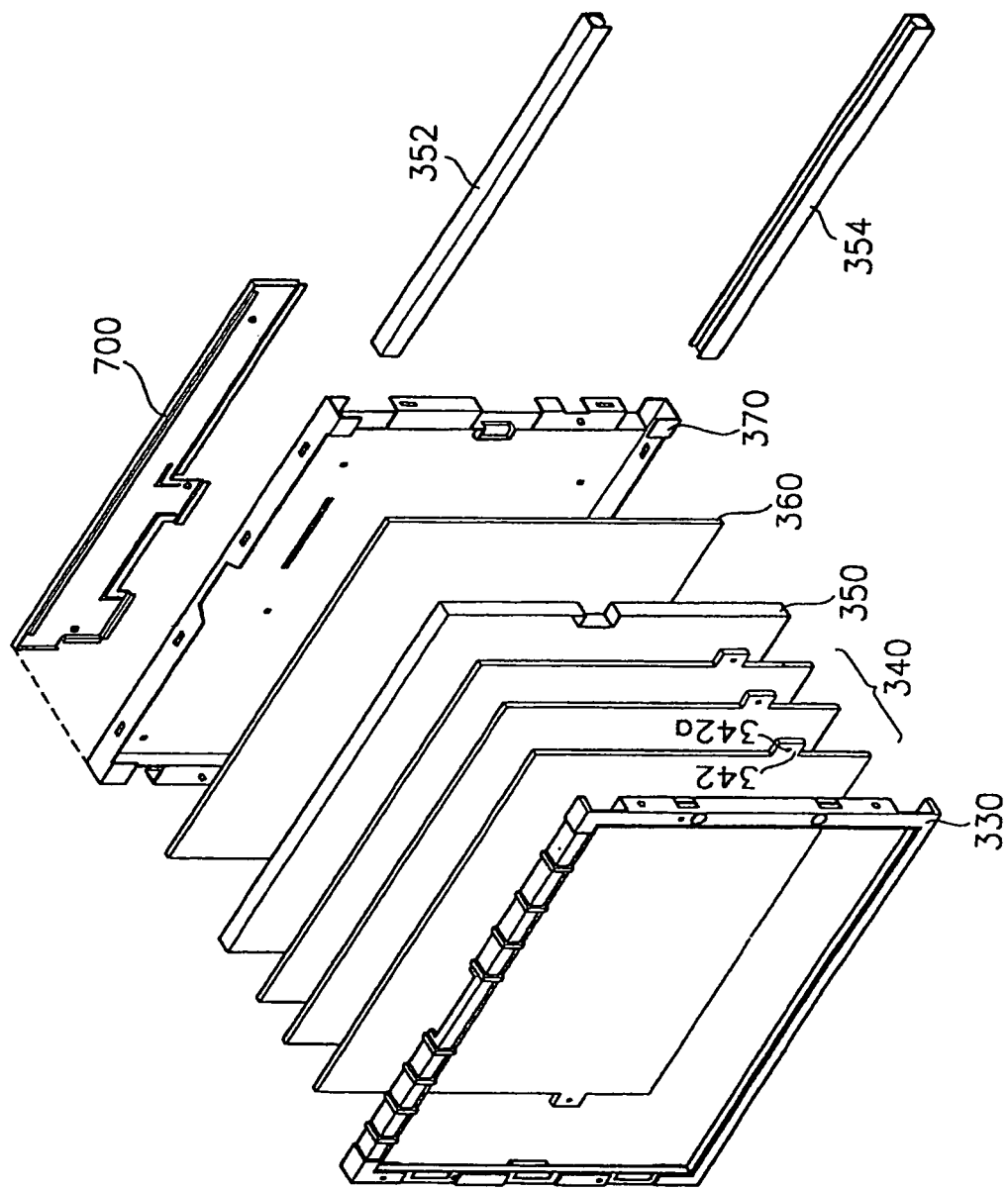

LIQUID CRYSTAL DISPLAY APPARATUS

CROSS REFERENCE TO RELATED APPLICATIONS

This application is a continuation application of U.S. patent application Ser. No. 11/430,568, filed May 9, 2006, which is a continuation of U.S. patent application Ser. No. 11/019,010, filed Dec. 21, 2004, which is a continuation application of U.S. patent application Ser. No. 10/286,654, filed Nov. 1, 2002, which claims priority to Korean Patent Application 2002-0012519, filed on Mar. 8, 2002, the entire contents of which are incorporated herein by reference.

BACKGROUND OF THE INVENTION

1. Field of the Invention

The present invention relates to an LCD (Liquid Crystal Display) apparatus, and more particularly to an LCD apparatus having a reduced size and weight.

2. Description of the Related Art

Information processing devices have developed to include various shapes and functions with rapid data processing speed. In such information processing devices, processed information in the form of an electric signal requires a display device as an interface.

A liquid crystal display apparatus having a light weight and a compact size, as compared with a CRT type display device, has been developed to achieve full-color and high-resolution functions. Generally, the liquid crystal display apparatus changes an arrangement of liquid crystal molecules into a specific arrangement by applying a voltage to the liquid crystal molecules. The liquid crystal display apparatus converts variations in optical properties, such as birefringence, optical linearity, dichroism and light scattering features of liquid crystal cells, which emit light due to the specific arrangement, into variations in visual properties, thereby displaying an image.

FIG. 1 is an exploded perspective view showing a conventional LCD and FIG. 2 is a cross-sectional view showing an assembled structure of the LCD shown in FIG. 1.

Referring to FIGS. 1 and 2, the LCD 100 includes a front case 110, a top chassis 120, an LCD module 130, a bottom chassis 140, a bottom mold frame 150 and a rear case 160.

The LCD module 130 includes a backlight assembly 134 for emitting a light, a middle mold frame 133 and a display unit 132 for displaying an image in response to the light emitted from the backlight assembly 134. The display unit 132 includes an LCD panel 132a, data and gate PCBs 132f and data and gate TCP (Tape Carrier Package) 132e and 132d.

The LCD panel 132 includes a TFT (Thin Film Transistor) substrate 132b, a color filter substrate 132c facing the TFT substrate 132b and a liquid crystal (not shown) interposed therebetween.

The TFT substrate 132b is a transparent glass substrate on which TFTs are arranged in a matrix shape. The color filter substrate 132c includes RGB pixels that are formed by a thin film process to present desired colors in response to the light. Common electrodes made of ITO (Indium Tin Oxide) are disposed on an entire surface of the color filter substrate 132c.

When a power is applied to gate and source terminals of TFTs arranged on the TFT substrate 132b, the TFTs are turned on so that an electric field is generated between pixel electrodes and the common electrodes of the color filter substrate 132c. The electric field varies an aligning angle of the liquid crystal interposed between the TFT substrate 132b and the color filter substrate 132c. Accordingly, a light transmittance is varied according to the variation of the aligning angle of the liquid crystal, so a desired image can be obtained. In order to control the aligning angle and the aligning time of the liquid crystal in the LCD panel 132, driving and timing signals are applied to the gate and data lines of the TFTs.

The backlight assembly 134 is provided below the display unit 132 so as to uniformly supply the light into the display unit 132. The backlight assembly 134 includes lamp units 134c and 134d for emitting the light, a light guiding plate 134b for changing a path of the light while guiding the light to the display unit 132, a plurality of optical sheets 134a for allowing a brightness of the light emitted from the light guiding plate 134b to be uniform, and a reflecting plate 134e disposed below the light guiding plate 134b to reflect the light leaked from the light guiding plate 134b to the light guiding plate 134b, thereby improving the optical efficiency.

The backlight assembly 134 is received in the bottom chassis 140 and the bottom chassis 140 is combined with the bottom mold frame 150.

BRIEF SUMMARY OF THE INVENTION

The present invention provides an LCD apparatus having a reduced size and weight.

The present invention also provides an LCD apparatus having a reduced number of component.

In one aspect of the invention, there is provided an LCD apparatus comprising: a displaying means for receiving a light and displaying an image; a light guiding means for guiding the light to the displaying means; a brightness increasing means for increasing a brightness of the light guided by the light guiding means; a receiving means having a bottom surface, four sidewalls and at least one first supporting member disposed on at least one sidewall, for sequentially receiving the light guiding means and the brightness increasing means, the first supporting member being inwardly extended to guide the light guiding means to a receiving position; and a fixing means coupled to the receiving means, for fixing the light guiding means and the brightness increasing means to the receiving means.

In another aspect, there is provided an LCD apparatus comprising: a light generating means for generating a light; a displaying means for receiving the light and displaying an image using a liquid crystal disposed therein; a light guiding means for guiding the light to the displaying means; a brightness increasing means for increasing a brightness of the light and providing the light to the displaying means; a receiving means having a bottom surface, four sidewalls and at least one first supporting member disposed on at least one sidewall, for sequentially receiving the light generating means, the light guiding means and the brightness increasing means, the first supporting member being inwardly extended to guide the light guiding means to a receiving position; and a fixing means having a second supporting member coupled to the first supporting member, for fixing the light generating means, the light guiding means and the brightness increasing means to the receiving means.

According to the present invention, the bottom chassis receives the backlight assembly, so that a bottom mold frame for receiving the backlight assembly is removed. Thus, it is able to reduce a manufacturing cost and weight of the LCD apparatus.

BRIEF DESCRIPTION OF THE DRAWINGS

The above and other advantages of the present invention will become readily apparent with reference to the following detailed description and the accompanying drawings wherein:

FIG. 14 is a plan view showing a structure of a rear surface of a mold frame corresponding to the bottom chassis shown in FIG. 10;

FIG. 15 is an exploded perspective view showing receiving and fixing structures of the backlight assembly shown in FIG. 3;

DETAILED DESCRIPTION OF THE INVENTION

Figure 1:
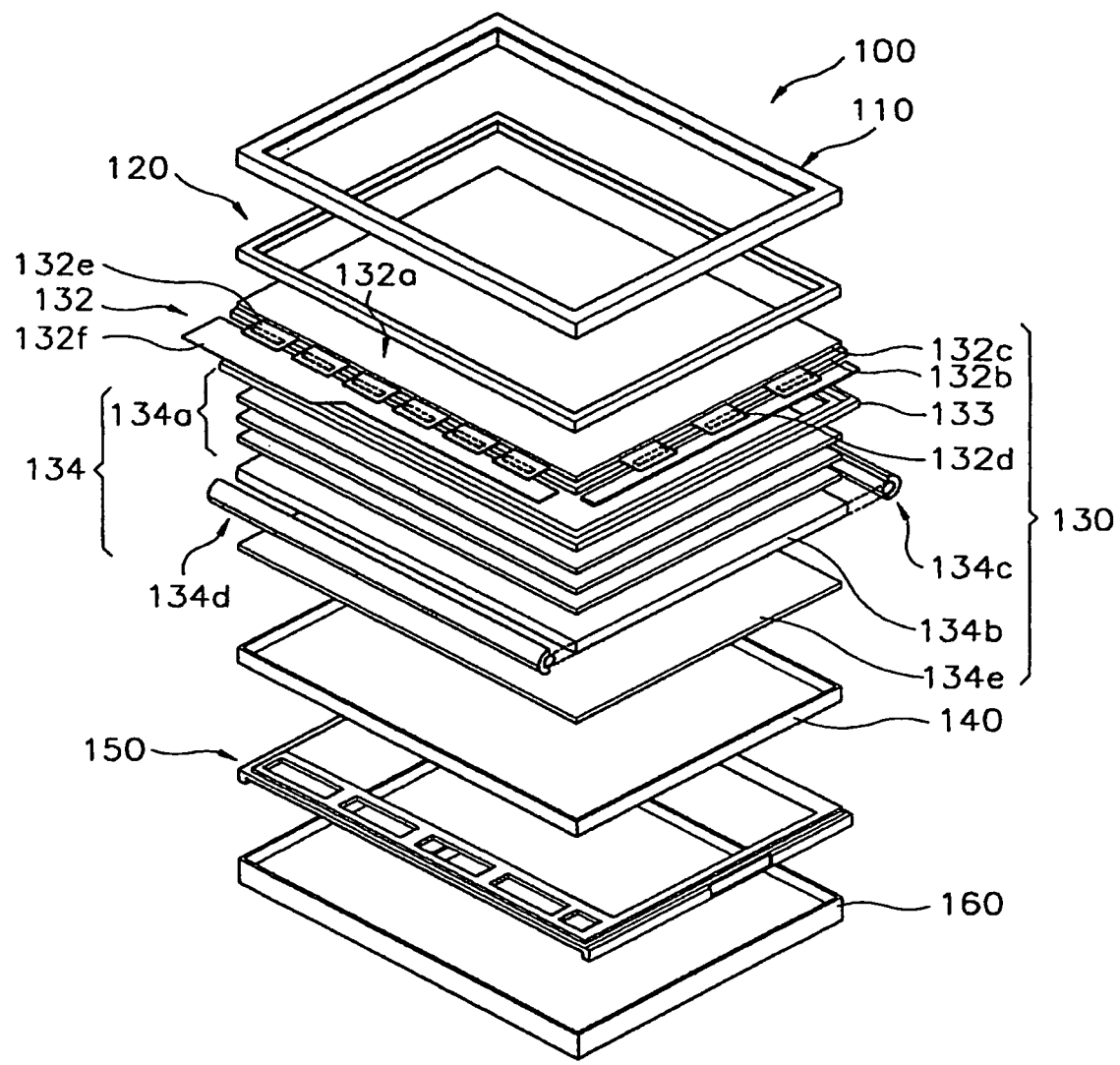
FIG. 1 is an exploded perspective view showing a conventional LCD.
Figure 2:
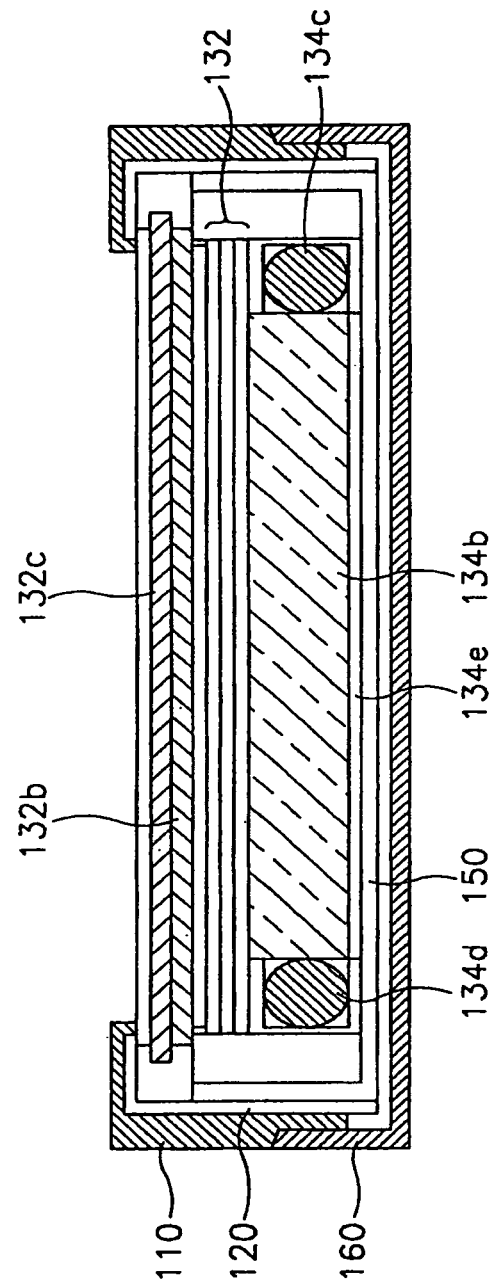
FIG. 2 is a cross-sectional view showing an assembled structure of the LCD shown in FIG. 2.
Figure 3:
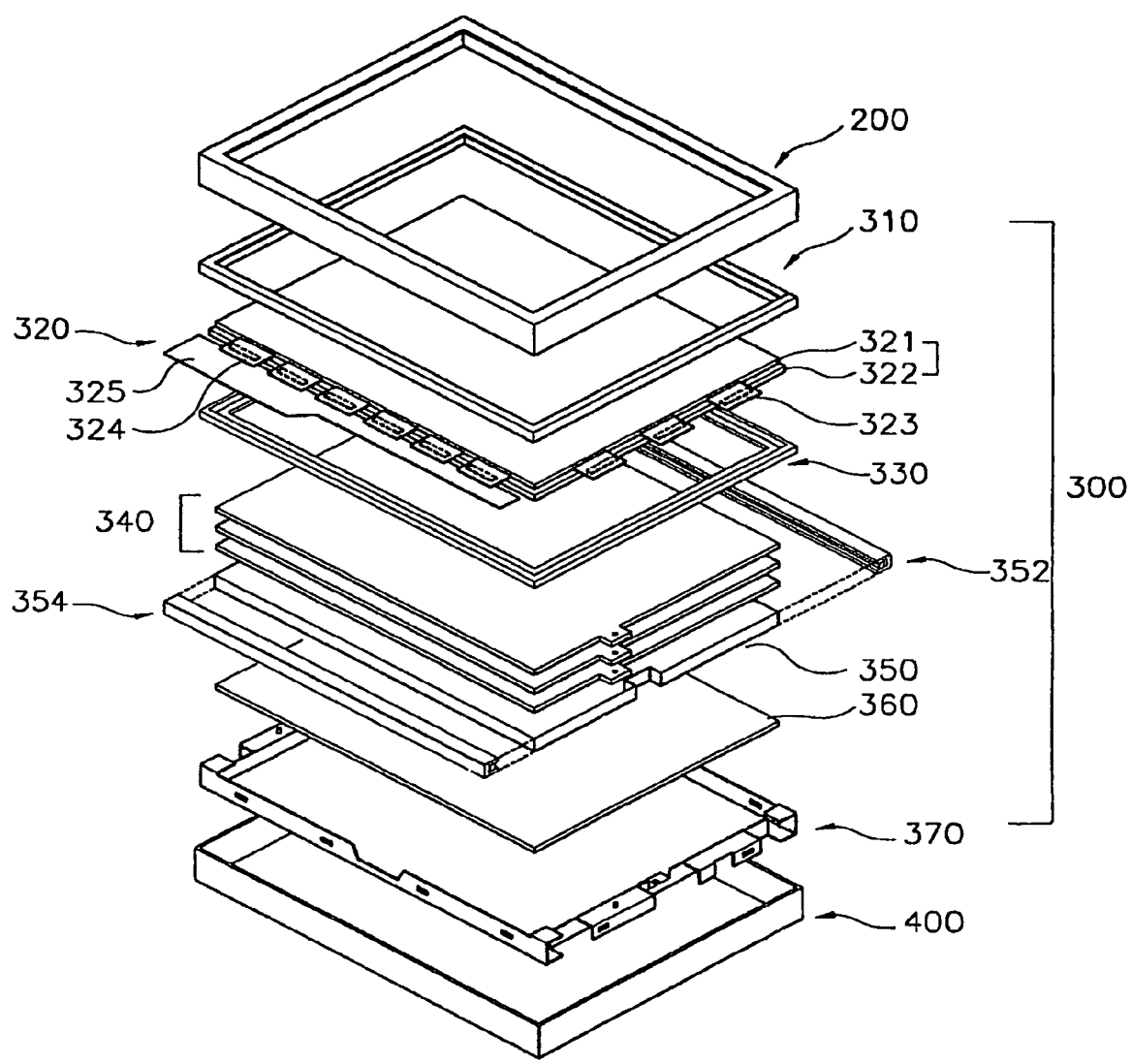
FIG. 3 is an exploded perspective view showing an LCD according to the present invention.

FIG. 3 is an exploded perspective view showing an LCD according to the present invention.

Referring to FIG. 3, the LCD includes a front case 200, an LCD module 300 for displaying an image in response to an image signal from an external and a rear case 400. The front case 200 is combined with the rear case 400 and the LCD module 300 is disposed between the front and rear cases 200 and 400.

The LCD module 300 includes a top chassis 310, a display unit 320, a mold frame 330, an optical sheet 340, a light guiding plate 350, a reflecting plate 360 and a bottom chassis 370. The top chassis 310 is disposed between the front case 200 and the display unit 320.

The display unit 320 includes an LCD panel, a gate TCP 323, a data TCP 324 and an integrated PCB 325. The LCD panel includes a color filter substrate 321, a TFT substrate 322 and a liquid crystal (not shown).

The TFT substrate 322 is a transparent glass substrate on which TFTs are arranged in a matrix shape. Data lines are connected to source terminals of the TFTs and gate lines are connected to gate terminals of the TFTs. Pixel electrodes made of, for example, ITO are connected to drain terminals of the TFTs. When a power is applied to the data and gate lines, the power is supplied to the source and gate terminals of the TFTs, respectively, so that the TFTs are turned on or turned off so as to supply the power to the drain terminals.

The color filter substrate 321 faces the TFT substrate 322. The color filter substrate 321 includes RGB pixels that may be formed by a thin film process and emit desired colors by a light. Common electrodes made of, for example, ITO are disposed on an entire surface of the color filter substrate 321.

When the power is applied to the gate and source terminals of TFTs arranged on the TFT substrate 322, the TFTs are turned on so that an electric field is generated between the pixel electrodes and the common electrodes of the color filter substrate 321. The electric field varies an aligning angle of the liquid crystal interposed between the TFT substrate 322 and the color filter substrate 321. Accordingly, a light transmittance is varied according to the variation of the aligning angle of the liquid crystal, so a desired image can be obtained. In order to control the aligning angle and the aligning time of the liquid crystal in the LCD panel, driving and timing signals are applied to the gate and data lines of the TFTs.

The integrated PCB 325 includes a first driving circuit which drives the gate lines of the LCD panel and is connected to the gate TCP 323 and a second driving circuit which drives the data lines of the LCD panel and is connected to the data TCP 324. Line patterns that provide driving signals for the gate lines to the LCD panel are printed on the gate TCP 323. The integrated PCB 325 is connected to one side of the LCD panel through the data TCP 324. Since the integrated PCB 325 is formed by integrating driving circuits of a gate PCB and a data PCB on one printed circuit board, a high density mounting technique is required to mount the driving circuits on the printed circuit board. By using a COG (Chip On Glass) technique, parts of the gate and data driving circuits are directly wire-bonded or bumped on the printed circuit board in a chip state or a part state, instead of a package state.

As shown in FIG. 3, the data TCP 324, which is a kind of a flexible printed circuit board, is attached to the source side of the LCD panel to determine the timing for applying a data driving signal and the gate TCP 323 is attached to the gate side of the LCD panel to determine the timing for applying a gate driving signal. The integrated PCB 325 is connected to the data TCP 324 positioned in a data line side of the LCD panel so as to respectively apply the driving signals to the gate lines and the data lines in response to the image signal from the external of the LCD panel. The integrated PCB 325 includes a source part for receiving an image signal from an external information processing device (not shown) such as a computer and applying the data driving signal to the LCD panel and a gate part for applying the gate driving signal to the gate lines of the LCD panel.

That is, the integrated PCB 325 generates signals for driving the LCD apparatus, such as the gate driving signal and the data driving signal, and a plurality of timing signals for timely applying the gate and data driving signals. The gate driving signal is applied to the gate lines of the LCD panel through the gate TCP 323 and the data driving signal is applied to the data lines of the LCD panel through the data TCP 324.

The mold frame 330 supports the display unit 320 and guides the optical sheet 340, the light guiding plate 350 and the reflecting plate 360 to proper positions by combining with the bottom chassis 370. The optical sheet 340 increases a brightness of the light emitted from the light guiding plate 350 disposed thereunder.

Figure 7:
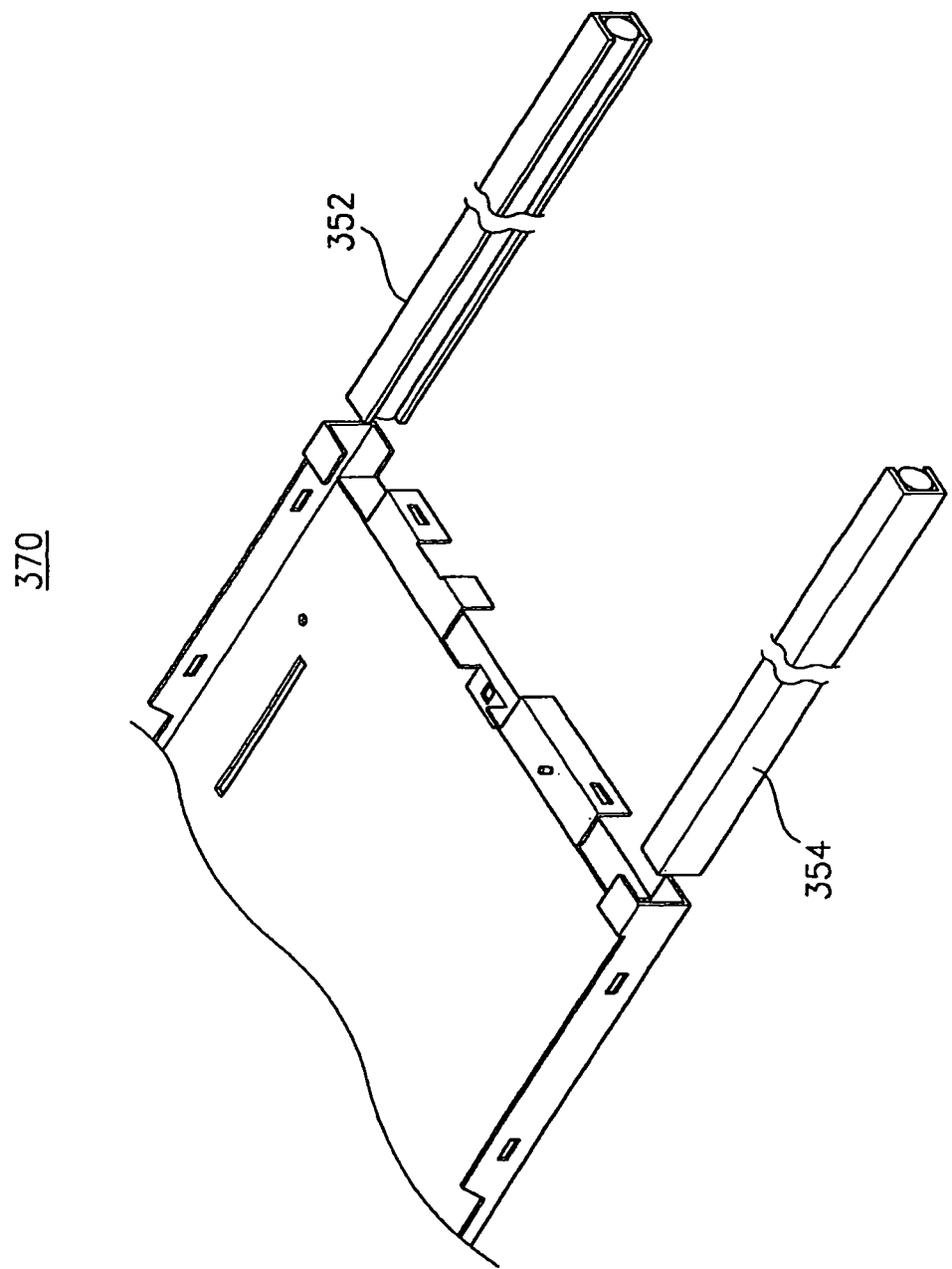
FIG. 7 is a partially exploded perspective view showing an assembled structure of a backlight assembly according to the present invention.

The light guiding plate 350 includes a first lamp unit 352 and a second lamp unit 354. The light guiding plate 350 changes an optical path while guiding the light emitted from the first and second lamp units 352 and 354 and provides the light to the display unit 320 through the optical sheet 340. The first lamp unit 352 is disposed adjacent to a first end portion of the light guiding plate 350 and the second lamp unit 354 is disposed adjacent to a second end portion of the light guiding plate 350 opposite the first end portion. Each of the first and second lamp units 352 and 354 includes a lamp for generating the light and a lamp cover for covering the lamp. A CCFL (Cold Cathode Fluorescent Lamp) may be used as the lamp. The lamp cover reflects the light emitted from the lamp toward the light guiding plate 350 to increase a condensing efficiency of the light. The first and second lamp units 352 and 354 are received in a space provided at opposing sidewalls of the bottom chassis 370 as shown in FIG. 7 and provide the light to sidewalls of the light guiding plate 350.

The reflecting plate 360 reflects the light leaked from the light guiding plate 350 toward the light guiding plate 350.

The bottom chassis 370 includes a projection for fixing the optical sheet 340 and a boss for fixing the light guiding plate 350. The bottom chassis 370 sequentially receives the reflecting plate 360, the light guiding plate 350 and the optical sheet 340 and is combined with the mold frame 330. The bottom chassis 370 is made of a conductive material such as a metal or a metal alloy, so that heat generated from the first and second lamp units 352 and 354 easily diffused to the external through the bottom chassis 370. Thus, it is able to prevent the LCD apparatus from being damaged by the heat generated from the first and second lamp units 352 and 354.

Figure 4:
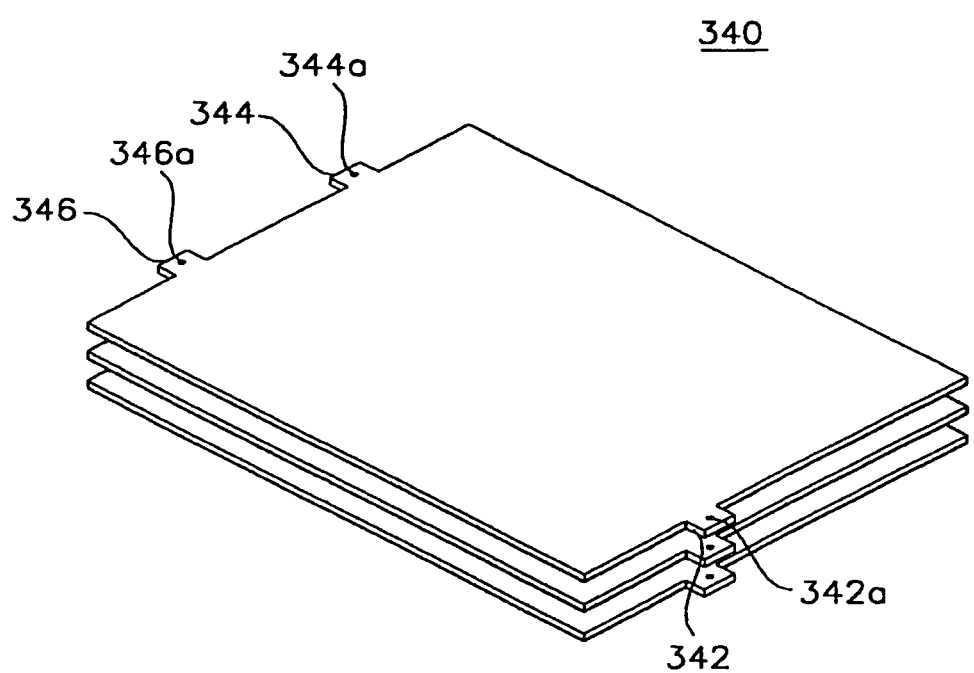
FIG. 4 is a perspective view showing optical sheets shown in FIG. 3.

FIG. 4 is a perspective view showing optical sheets shown in FIG. 3.

Referring to FIG. 4, each of the optical sheets 340 includes first, second and third fixing portions 342, 344 and 346. The first fixing portion 342 is extended from a first end portion of each of the optical sheets 340 and the second and third fixing portions 344 and 346 are extended from a second end portion of each of the optical sheets 340. The first to third fixing portions 342, 344 and 346 include first, second and third fixing holes 342a, 344a and 346a, respectively. As shown in FIG. 4, a number of fixing portions disposed on the first end portion of the optical sheet 340 can be different from a number of fixing portions disposed on the second end portion thereof, which facilitates an assembly process for the optical sheet 340 and the bottom chassis 370.

Figure 5:
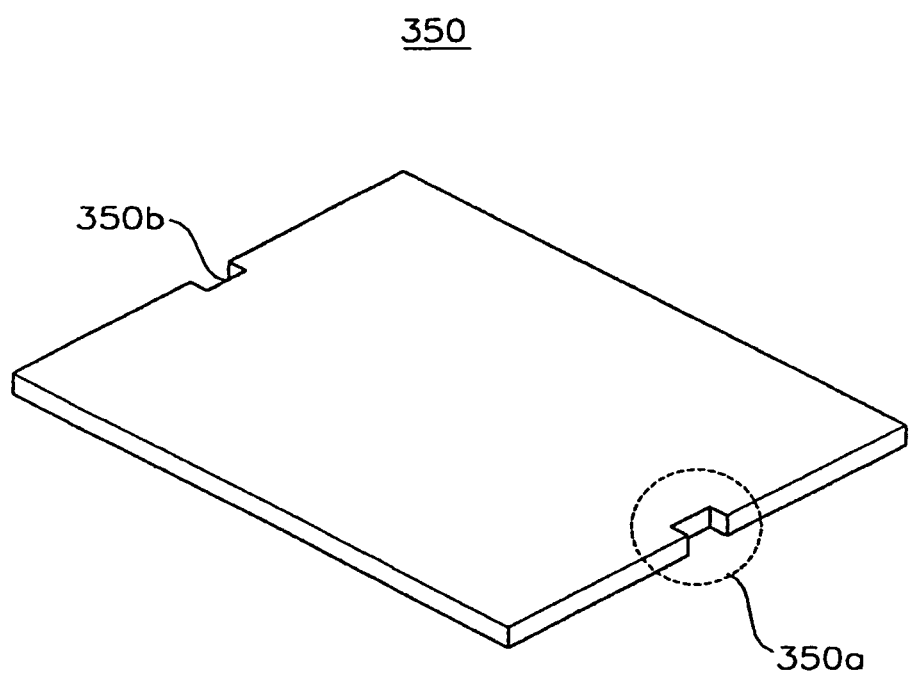
FIG. 5 is a perspective view showing a structure of a light guiding plate shown in FIG. 3.

FIG. 5 is a perspective view showing a structure of a light guiding plate shown in FIG. 3.

Referring to FIG. 5, the light guiding plate 350 has a flat shape having a size corresponding to the LCD panel of the display unit 320 and a uniform thickness. The light guiding plate 350 is made of a transparent material, for example, a transparent plastic resin such as an acrylic resin. Where a lamp unit is disposed adjacent to both ends of the light guiding plate 350, the light guiding plate 350 is formed in a flat shape having a constant thickness and where the lamp unit is disposed adjacent to only one end of the light guiding plate 350, the light guiding plate 350 is formed in a wedge shape having a varied thickness.

The light guiding plate 350 includes first and second guide grooves 350a and 350b having a laid U-shape, which are respectively recessed by a predetermined depth from both ends of the light guiding plate 350. The first and second guide grooves 350a and 350b prevent the light guiding plate 350 received in the bottom chassis 370 from being moved. The number and the position of the first and second guide grooves 350a and 350b depend on a number and a position of the fixing boss provided at the bottom chassis 370. The light guiding plate 350 includes a dot pattern (not shown) printed on a rear surface of the light guiding plate 350. The dot pattern reflects the light incident from the first and second lamp units 352 and 354 toward the display unit 320.

The reflecting plate 360 is disposed under the light guiding plate 350 as shown in FIG. 3. The reflecting plate 360 reflects the light leaked from the light guiding plate 350 toward the light guiding plate 350 so as to increase an availability of the light emitted from the first and second lamp units 352 and 354. The reflecting plate 360 may have a shape identical to that of the light guiding plate 350.

The optical sheet 340 having a plurality of optical sheets is disposed on the light guiding plate 350 to enhance a uniformity of the brightness of the light from the light guiding plate 350. The optical sheet 340 diffuses the light emitted from the light guiding plate 350 and condenses the diffused light in a direction perpendicular to the LCD panel.

Figure 6:
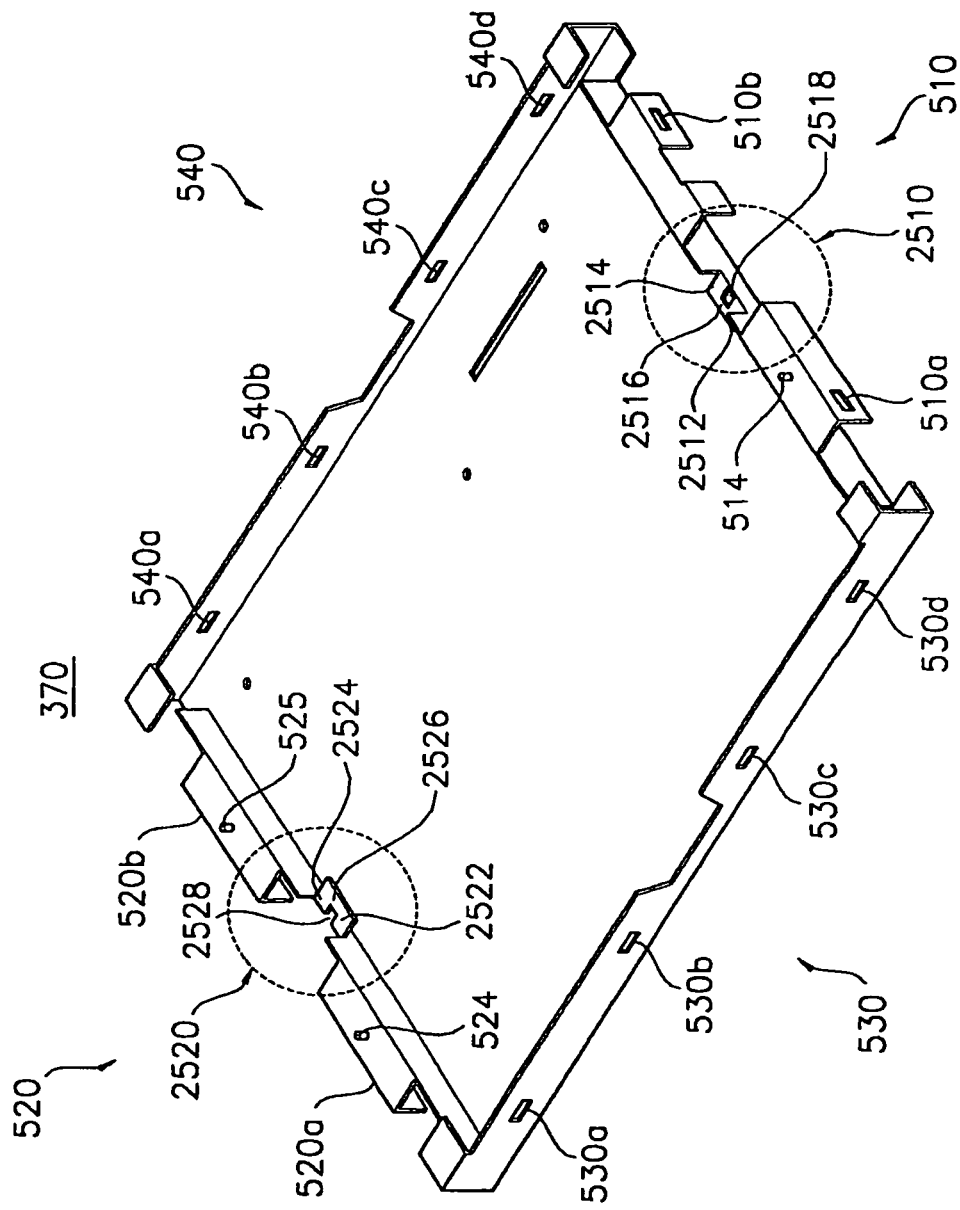
FIG. 6 is a perspective view showing a structure of a bottom chassis according to a first embodiment of the present invention.

FIG. 6 is a perspective view showing a structure of a bottom chassis according to a first embodiment of the present invention and FIG. 7 is a partially exploded perspective view showing an assembled structure of a backlight assembly according to the present invention.

Referring to FIG. 6, the bottom chassis 370 includes a bottom surface and four sidewalls 510, 520, 530 and 540 to provide a receiving space. The bottom chassis 370 sequentially receives the reflecting plate 360, the light guiding plate 350 and the optical sheet 340 in the receiving space. Two sidewalls among the four sidewalls of the bottom chassis 370 are defined as a first sidewall 510 and a second sidewall 520, which are parallel to each other in a width direction of the bottom chassis 370. Two sidewalls among the four sidewalls of the bottom chassis 370 are defined as a third sidewall 530 and a fourth sidewall 540, which are parallel to each other in a length direction of the bottom chassis 370. The bottom chassis 370 includes a plurality of engaging holes 510a, 510b, 520a, 520b, 530a, 530b, 530c, 530d, 540a, 540b, 540c and 540d.

The bottom chassis 370 includes a first supporting member 2510 and a second supporting member 2520 disposed on the first and second sidewalls 510 and 520, respectively. The first and second supporting members 2510 and 2520 are inwardly extended from the first and second sidewalls 510 and 520 to be coupled with the first and second guide grooves 350a and 350b, respectively.

The first supporting member 2510 includes a first member 2512 inwardly extended from the first sidewall 510, a second member 2514 extended from the first sidewall 510, spacing apart from the first member 2512 and a third member 2516 extended between the first and second members 2512 and 2514 to provide a first engaging hole 2518.

The second supporting member 2520 includes a fourth member 2522 inwardly extended from the second sidewall 520, a fifth member 2524 extended from the second sidewall 520, spacing apart from the fourth member 2522 and a sixth member 252b extended between the fourth and fifth members 2522 and 2524 to provide a second engaging hole 2528.

The first and second supporting members 2510 and 2520 are formed by partially bending the first and second sidewalls 510 and 520 toward inside. An interval between the bottom surface of the bottom chassis 370 and the first and second supporting members 2510 is smaller than a thickness of the light guiding plate 350.

Figure 8:
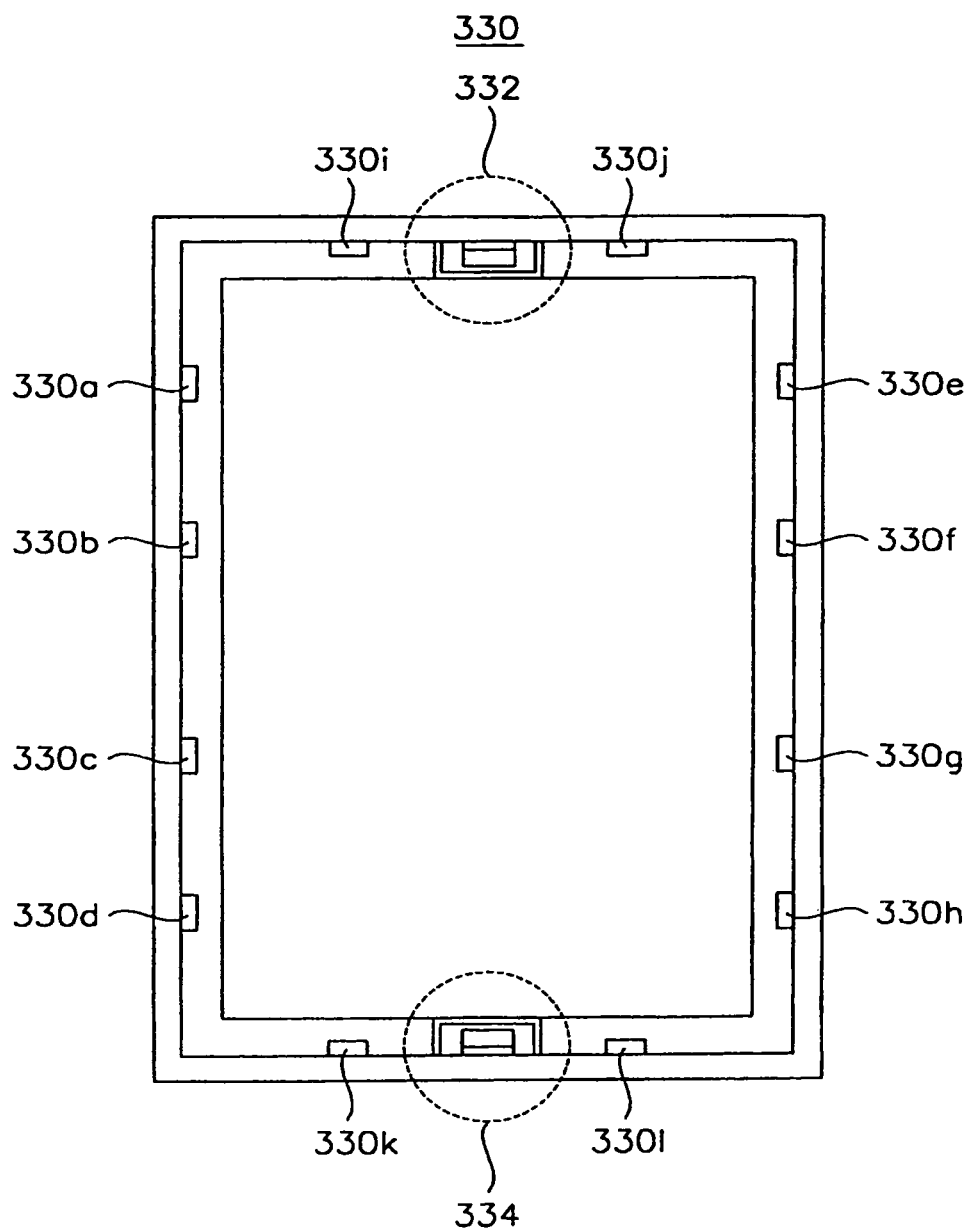
FIG. 8 is a plan view showing a structure of a mold frame shown in FIG. 3.

FIG. 8 is a plan view showing a structure of a mold frame shown in FIG. 3.

Referring to FIG. 8, the mold frame 330 has a rectangular shape and receives the LCD panel of the display unit 320. Upper and lower surfaces of the mold frame 330 are opened to partially expose the LCD panel. The mold frame 330 includes a plurality of engaging projections 330i, 330j, 330k, 330l, 330d, 330c, 330b, 330a, 330h, 330g, 330f and 330e corresponding to the engaging holes 510a, 510b, 520a, 520b, 530a, 530b, 530c, 530d, 540a, 540b, 540c and 540d of the bottom chassis 370. The engaging projections 330i, 330j, 330k, 330l, 330d, 330c, 330b, 330a, 330h, 330g, 330f and 330e are inwardly extended from sidewalls of the mold frame 330.

The mold frame 330 is combined with the bottom chassis 370 to cover an outer wall of the bottom chassis 370 by engaging the engaging projections 330i, 330j, 330k, 330l, 330d, 330c, 330b, 330a, 330h, 330g, 330f and 330e into the engaging holes 510a, 510b, 520a, 520b, 530a, 530b, 530c, 530d, 540a, 540b, 540c and 540d, respectively. Thus, it is able to prevent the optical sheet 340, the light guiding plate 350 and the reflecting plate 360 from being moved in the receiving space of the bottom chassis 370.

Further, the mold frame 330 includes a third supporting member 332 and a fourth supporting member 334 corresponding to the first and second supporting members 2510 and 2520 of the bottom chassis 370. The third and fourth supporting members 332 and 334 are combined with the first and second guide grooves 350a and 350b of the light guiding plate 350 along with the first and second supporting members 2510 and 2520, respectively.

Figure 9:
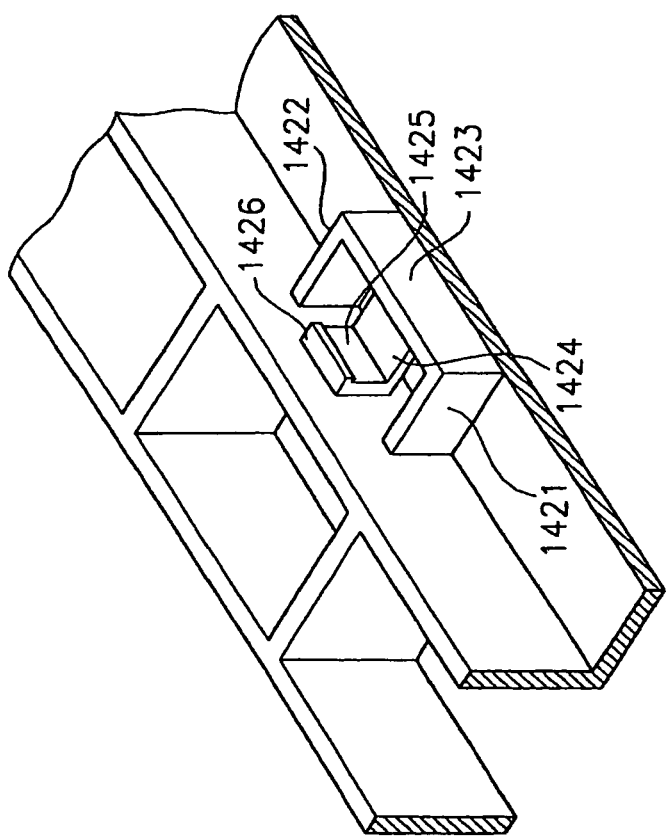
FIG. 9 is a perspective view showing a detailed structure of the mold frame shown in FIG. 8.

FIG. 9 is a perspective view showing a detailed structure of the third supporting member of the mold frame shown in FIG. 8. Referring to FIG. 9, the mold frame 330 includes the third supporting member 332 corresponding to the first supporting member 2510 of the bottom chassis 370. The third supporting member 332 is combined with the first guide grooves 350a of the light guiding plate 350 along with the first supporting members 2510.

The third supporting member 332 includes a first member 1421 inwardly protruded from the sidewall of the mold frame 330, a second member 1422 inwardly protruded from the sidewall of the mold frame 330, a third member 1423 extended between the first and the second members 1421 and 1422 to form a space defined by the first to third members 1421, 1422 and 1423, a fourth member 1424 extended from the third member 1423 toward the sidewall of the mold frame 330, a fifth member 1425 extended from the fourth member 1424 in a direction perpendicular to the fourth member 1424 and a sixth member 1426 extended from the fifth member 1425 toward the third member 1423. The fourth supporting member 334 shown in FIG. 8 has a same structure as that of the third supporting member 332.

Figure 10:
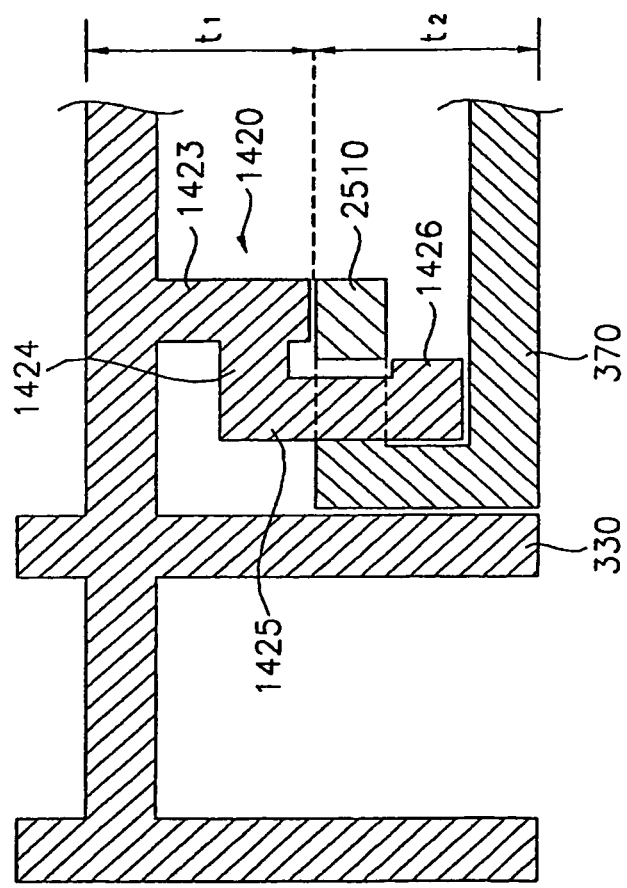
FIG. 10 is a partially cut cross-sectional view showing a structure of the bottom chassis shown in FIG. 6 assembled with the mold frame shown in FIG. 9.

FIG. 10 is a partially cut cross-sectional view showing a structure of the bottom chassis shown in FIG. 6 assembled with the mold frame shown in FIG. 9.

Referring to FIG. 10, the first and third supporting members 2510 and 332 are received in the first guide groove 350a of the light guiding plate 350, so that the mold frame 330 and the bottom chassis 370 are combined. A sum of a distance (t1) between the bottom surface of the mold frame 330 and an upper surface of the third supporting member 332 and a distance (t2) between the bottom surface of the bottom chassis 370 and an upper surface of the first supporting member 2510 is identical to a sum of a thickness of each of the reflecting plate 360, the light guiding plate 350 and the optical sheet 340. Since the first and third supporting members 2510 and 332 are received in the first guide groove 350a to support the light guiding plate 350, it is able to prevent the light guiding plate 350 received in the receiving space of the bottom chassis 370 from being moved.

Figure 11:
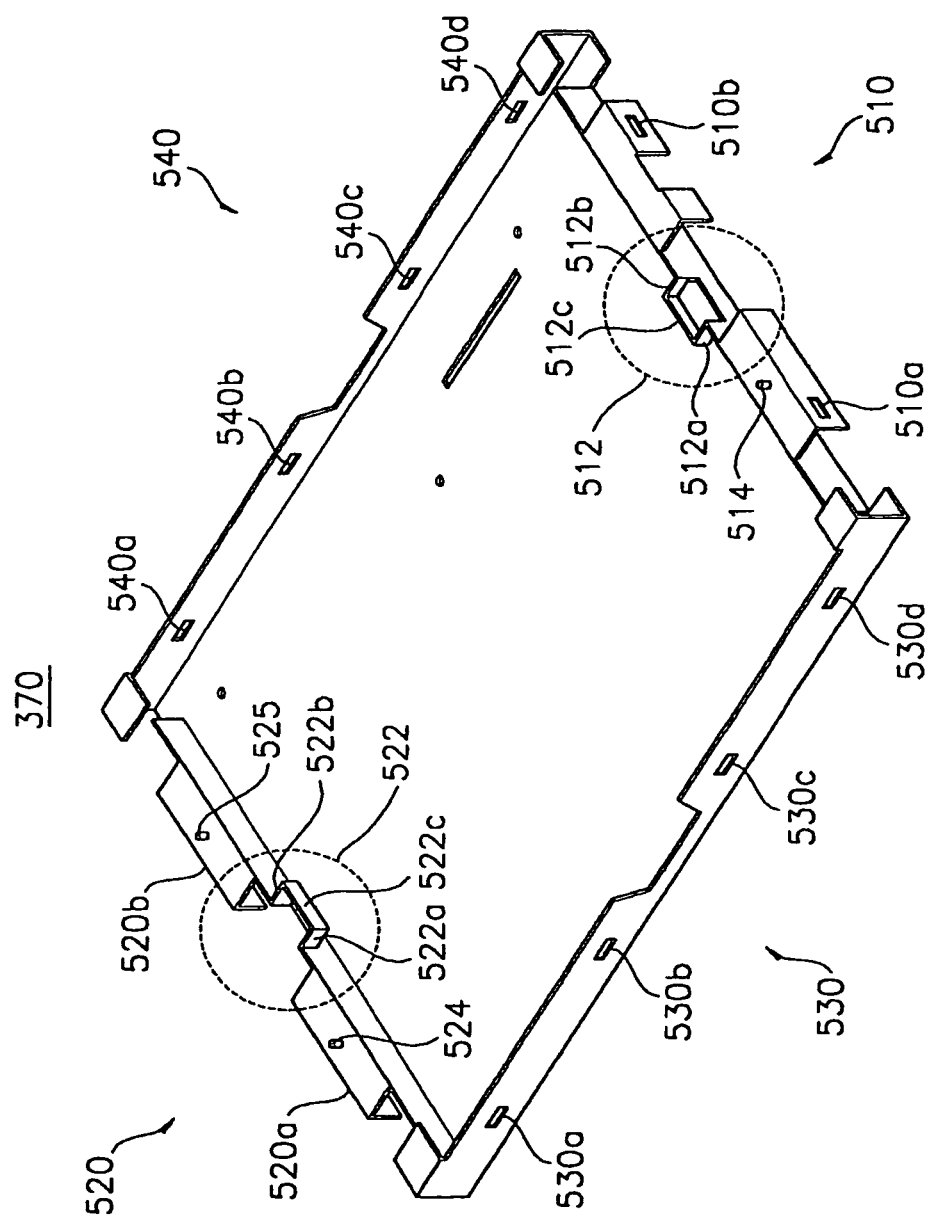
FIG. 11 is a perspective view showing a structure of a bottom chassis according to a second embodiment of the present invention.
Figure 12:
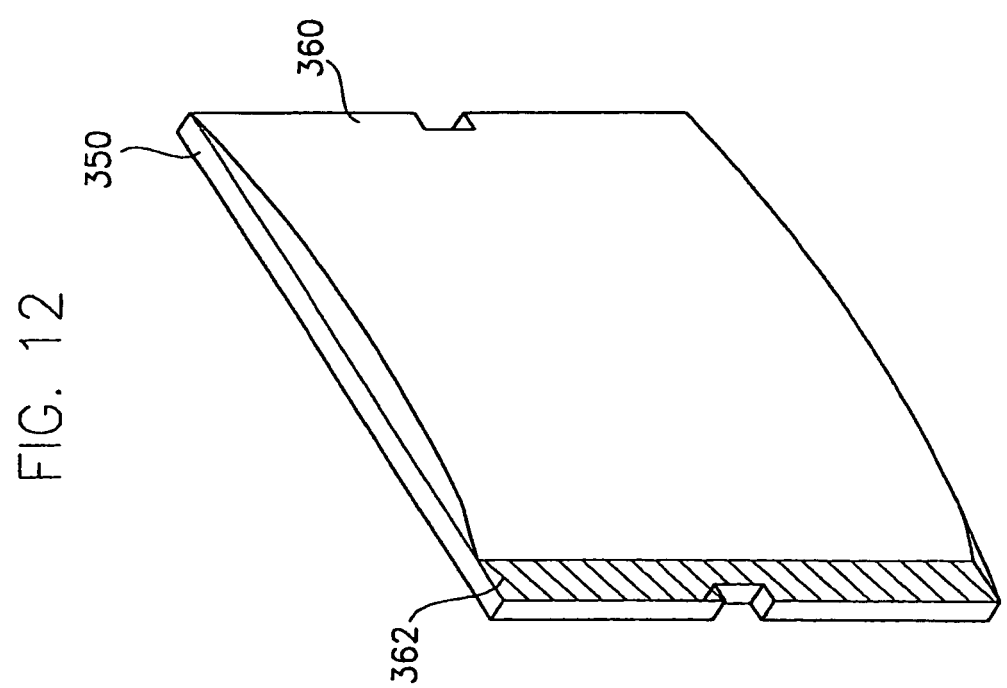
FIG. 12 is a perspective view showing a structure of a reflecting plate shown in FIG. 3 assembled with the light guiding plate shown in FIG. 11.

FIG. 11 is a perspective view showing a structure of a bottom chassis according to a second embodiment of the present invention. FIG. 12 is a perspective view showing a structure of a reflecting plate shown in FIG. 3 assembled with the light guiding plate shown in FIG. 11.

Referring to FIGS. 11 and 12, the bottom chassis 370 includes a bottom surface and first to fourth sidewalls 510, 520, 530 and 540. The bottom chassis 370 includes a first supporting member 512 and a second supporting member 522 disposed on the first and second sidewalls 510 and 520, respectively. The first and second supporting members 512 and 522 are inwardly extended from the first and second sidewalls 510 and 520 to have a predetermined width corresponding to that of the first and second guide grooves 350a and 350b of the light guiding plate 350, respectively. The first and second supporting members 512 and 522 are combined with the first and second guide grooves 350a and 350b, respectively to prevent the light guiding plate 350 received in the bottom chassis 370 from being moved. FIG. 11 shows that the bottom chassis 370 has two supporting members in two sidewalls thereof. However, the bottom chassis 370 may have one or more supporting members in one or two sidewalls thereof.

The first supporting member 512 includes a first member 512a inwardly extended from the first sidewall 510, a second member 512b inwardly extended from the first sidewall 510, spacing apart from the first member 512a and a third member 512c extended between the first and second members 512a and 512b.

The second supporting member 522 includes a fourth member 522a inwardly extended from the second sidewall 520, a fifth member 522b inwardly extended from the second sidewall 520, spacing apart from the fourth member 522a and a sixth member 522c extended between the fourth and fifth members 522a and 522b. The first and second supporting members 512 and 522 prevent the light guiding plate 350 from being moved in the bottom chassis 370.

The bottom chassis 370 includes a plurality of engaging holes 510a, 510b, 520a, 520b, 530a, 530b, 530c, 530d, 540a, 540b, 540c and 540d in the first to fourth sidewalls 510, 520, 530 and 540.

The bottom chassis 370 includes a first fixing boss 514 disposed on the first sidewall 510, a second fixing boss 524 and a third fixing boss 525 disposed on the second sidewall 520. The first, second and third fixing bosses 514, 524 and 525 are coupled with the first, second and third fixing holes 342a, 344a and 346a of the first to third fixing portions 342, 344 and 346 of the optical sheet 340, respectively.

The light guiding plate 350 is fixed to the receiving space of the bottom chassis 370 by combining the first and second supporting members 512 and 522 of the bottom chassis 370 with the first and second guide grooves 350a and 350b of the light guiding plate 350. To prevent the reflecting plate 360 from being moved, an end portion of a rear surface of the light guiding plate 350 is adhered to an end portion of an upper surface of the reflecting plate 360 by an adhesive member 362 as shown in FIG. 12. As the adhesive member 362, an adhesive tape can be used. As a result, the reflecting plate 360 is integrated with the light guiding plate 350, thereby preventing the reflecting plate 360 from being moved. The adhered region of the light guiding plate 350 and the reflecting plate 360 does not have an effect on a display area of the LCD panel.

The first and second supporting members 512 and 522 have a height appropriate to prevent the light guiding plate 350 and the reflecting plate 360 received in the bottom chassis 370 from being moved. Accordingly, the first and second supporting members 512 and 522 have the height identical to a sum of a thickness of each of the light guiding plate 350 and the reflecting plate 360.

The bottom chassis 370 includes a first lamp insertion portion and a second lamp insertion portion disposed on the third and fourth sidewalls 530 and 540, respectively. The first and second lamp insertion portions can be formed by partially bending the third and the fourth sidewalls 530 and 540 to have a laid U-shape as shown in FIGS. 7 and 11. For example, the first lamp unit 352 is received adjacent to the third sidewall 530. The second lamp unit 354 is received adjacent to the fourth sidewall 540. The light guiding plate 350 is received between the first and second lamp units 352 and 354. The first and the second lamp units 352 and 354 are inserted into the receiving space of the bottom chassis 370 through openings of the first and second lamp insertion portions and adopted to the third and fourth sidewalls 530 and 540, respectively. For example, the first and second lamp units 352 and 354 are slid to be guided into receiving portions. Each of the third and fourth sidewalls 530 and 540 includes a body portion connected to an end of the bottom surface and a guiding portion partially bending from an upper portion of the first portion to cover an end portion of an upper surface of the light source. The body portion includes a first portion corresponding to the receiving space and a second portion corresponding to an outside of the receiving space. The guiding portion may be bent from an upper end of the second portion of the body portion. The first and second sidewalls 510 and 520 may be separated from the third and fourth sidewalls 530 and 540 to form openings. The openings may serve as the insertion portions.

Figure 13A:
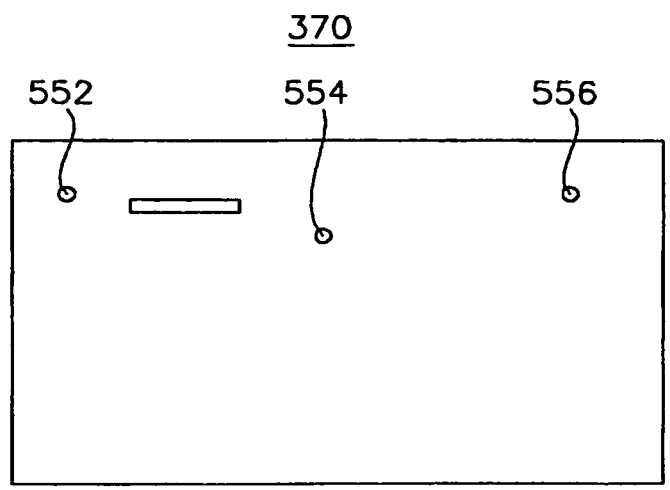
FIGS. 13A and 13B are views showing a structure of a rear surface of the bottom chassis shown in FIG. 10.
Figure 13B:
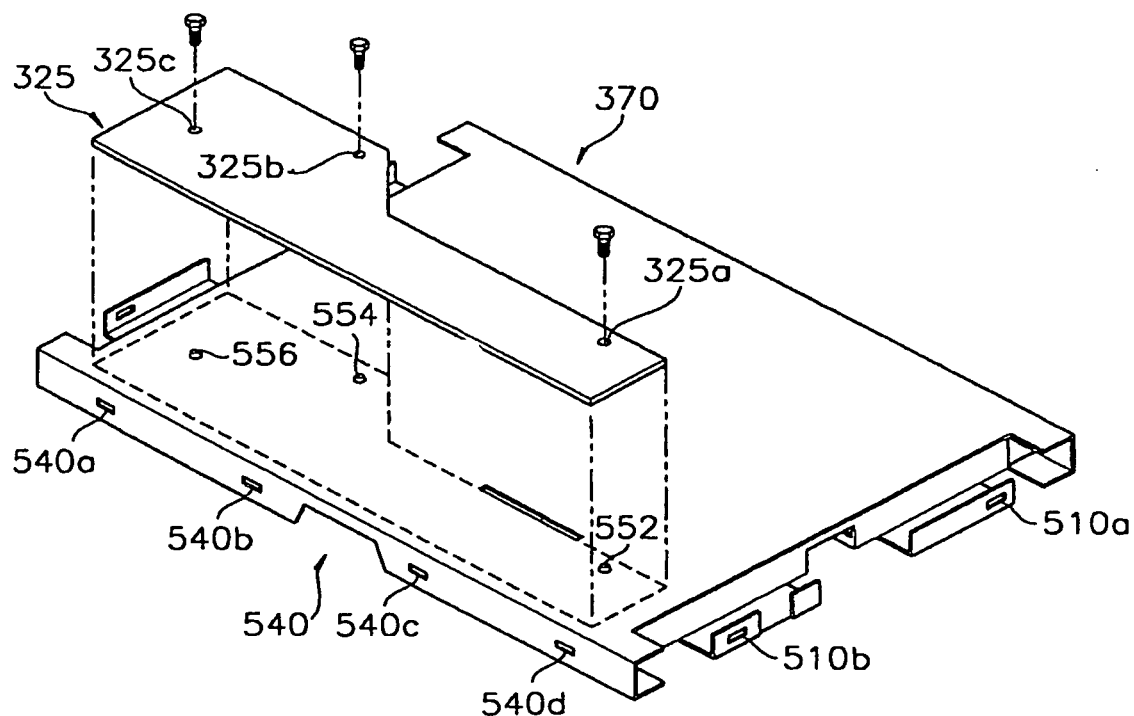

FIGS. 13A and 13B are views showing a structure of a rear surface of the bottom chassis shown in FIG. 6.

Referring to FIGS. 13A and 13B, the bottom chassis 370 includes a first grounding portion 552, 554 and 556 protruded from the rear surface of the bottom chassis 370. The first grounding portion 552, 554 and 556 fixes the integrated PCB 325 bent on outer surface of the mold frame 330 shown in FIG. 3 to the rear surface of the bottom chassis 370. The integrated PCB 325 is grounded through the first grounding portion 552, 554 and 556.

The first grounding portion 552, 554 and 556 is in contact with a second grounding portion 325a, 325b and 325c disposed in the integrated PCB 325. The first grounding portion 552, 554 and 556 and the second grounding portion 325a, 325b and 325c include a plurality of perforation holes. The integrated PCB 325 is fixed to the rear surface of the bottom chassis 370 by means of screws engaging into the rear surface of the bottom chassis 370 through the perforation holes of the first and second grounding portions 552, 554, 556, 325a, 325b and 325c. The integrated PCB 325 fixed to the rear surface of the bottom chassis 370 is covered by a PCB cover (not shown). A portion of the rear surface of the bottom chassis 370 except a portion of the first and second grounding portions 552, 554, 556, 325a, 325b and 325c is covered by an insulating member (not shown) such as an insulating tape in order to prevent a circuit part of the integrated PCB 325 from being electrically in contact with the bottom chassis 370.

FIG. 14 is a plan view showing a structure of a rear surface of a mold frame corresponding to the bottom chassis shown in FIG. 10 and FIG. 15 is an exploded perspective view showing receiving and fixing structures of the backlight assembly shown in FIG. 3.

Referring to FIG. 15, the first and second lamp units 352 and 354 are inserted into the first and second lamp insertion portions of the bottom chassis 370. The reflecting plate 360, the light guiding plate 350 and the optical sheet 340 are sequentially received in the receiving space of the bottom chassis 370 and the bottom chassis 370 is combined with the mold frame 330. The PCB cover 700 covers the integrated PCB 325 fixed to the rear surface of the bottom chassis 370.

Figure 16:
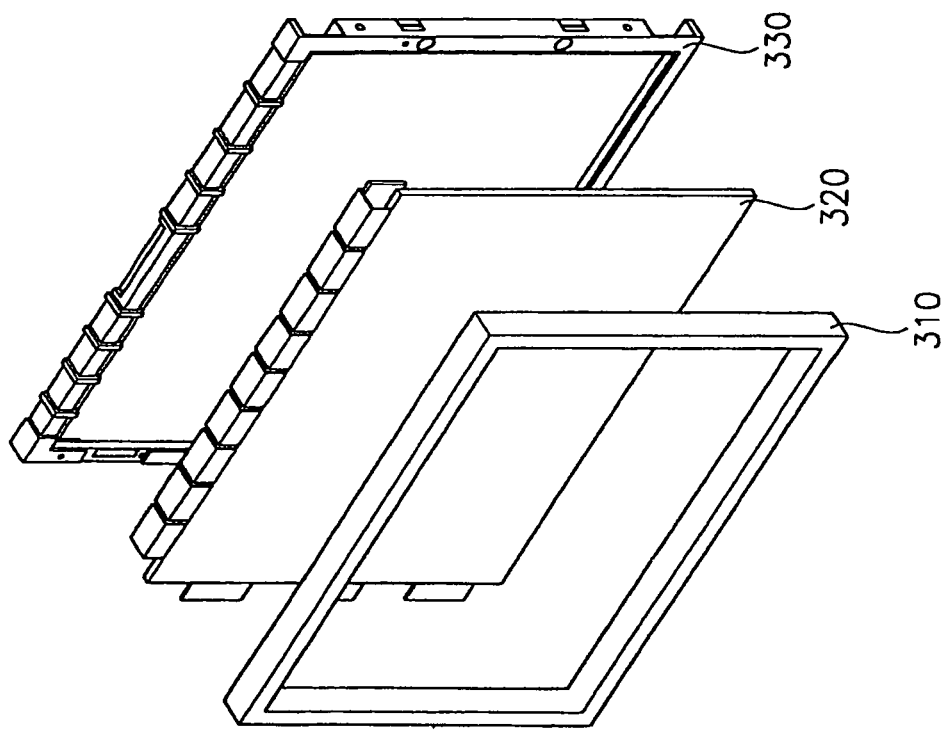
FIG. 16 is an exploded perspective view showing receiving and fixing structures of a display unit shown in FIG. 3.

FIG. 16 is an exploded perspective view showing receiving and fixing structures of a display unit shown in FIG. 3.

Referring to FIGS. 3 and 16, the display unit 320 is received on the mold frame 330. The top chassis 310 is provided on the display unit 320 to fix the integrated PCB 325 and the gate TCP 323 to the rear surface of the bottom chassis 370. The top chassis 310 includes a bottom surface and a sidewall extended from an end portion of the bottom surface in a direction perpendicular to the bottom surface. The bottom surface of the top chassis 310 is opened to expose an effective display area of the LCD panel and the sidewall of the top chassis 310 covers an edge of an upper surface of the LCD panel.

To prevent a plurality of integrated circuits of the gate TCP 323 from being damaged due to a direct contact of the plurality of integrated circuits with the outer surface of the mold frame 330, a plurality of ribs are formed on the sidewall of the mold frame 330 in a predetermined interval from each other.

The front case 200 is disposed on the top chassis 310. The front case 200 covers the top chassis 310 and the display unit 320 and combines with the mold frame 330.

Figure 17A:
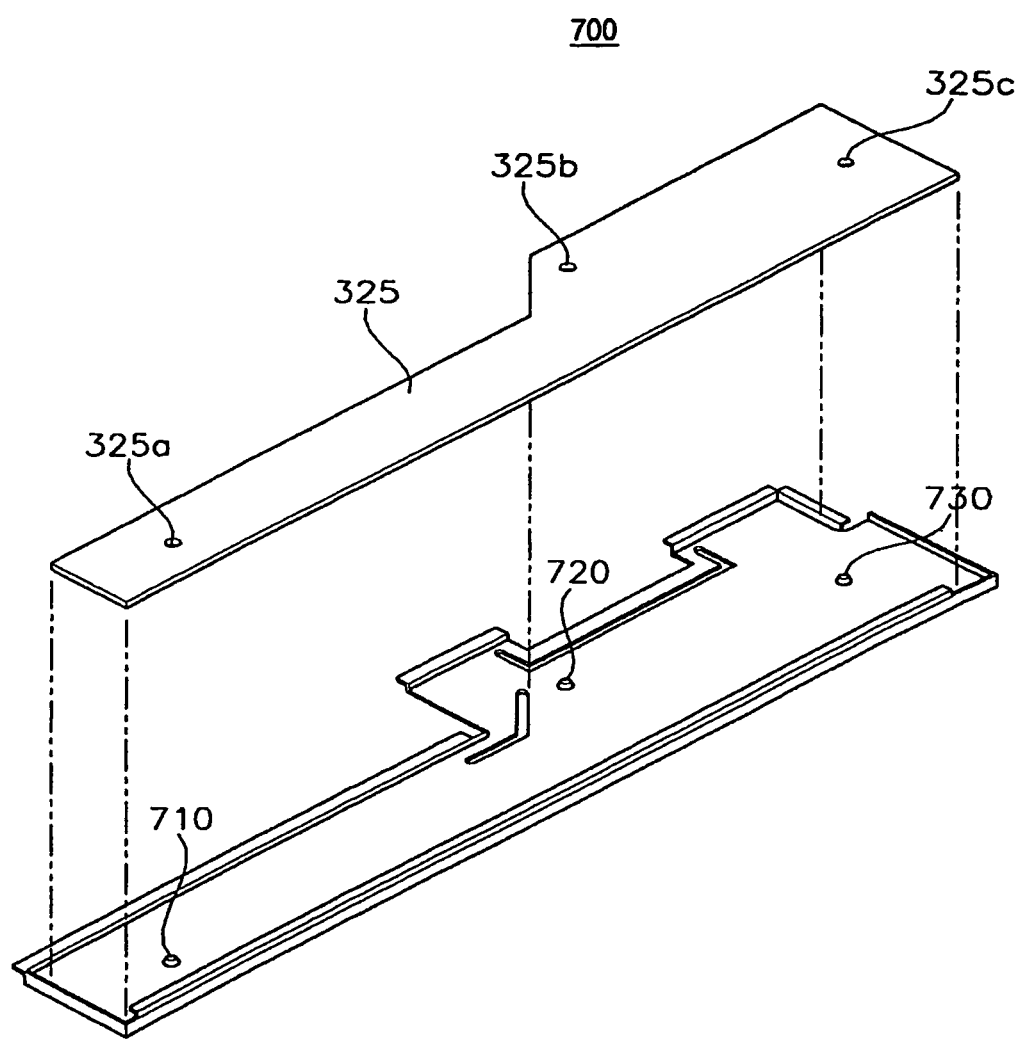
FIGS. 17A and 17B are views illustrating a PCB cover according to the present invention.
Figure 17B:
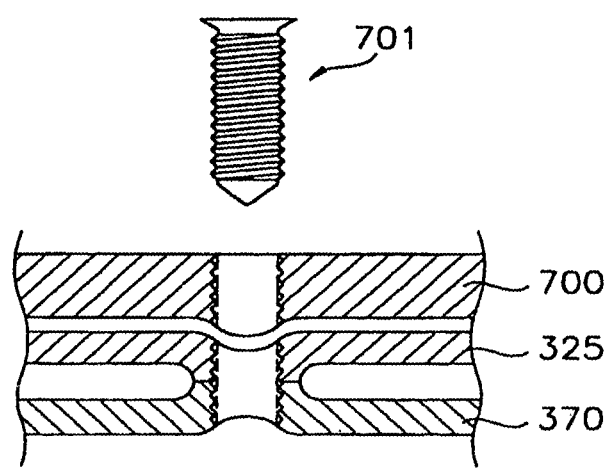

FIG. 17A is a perspective view illustrating the PCB cover shown in FIG. 15 and FIG. 17B is a view illustrating a structure of the integrated PCB combined with the bottom chassis.

As shown in FIG. 17A, the PCB cover 700 has a size appropriate to cover the integrated PCB 325 and a plurality of perforation holes 710, 720 and 730 corresponding to the first grounding portion 552, 554 and 556.

Referring to FIGS. 17A and 17B, the first grounding portion 552, 554 and 556 disposed on the bottom chassis 370 is coupled to the second grounding portion 325a, 325b and 325c to ground the integrated PCB 325. The integrated PCB 325 and the PCB cover 700 are fixed to the rear surface of the bottom chassis 370 by a screw 701 inserted into the perforation holes of the first and second grounding portion and the PCB cover 700.

Figure 18:
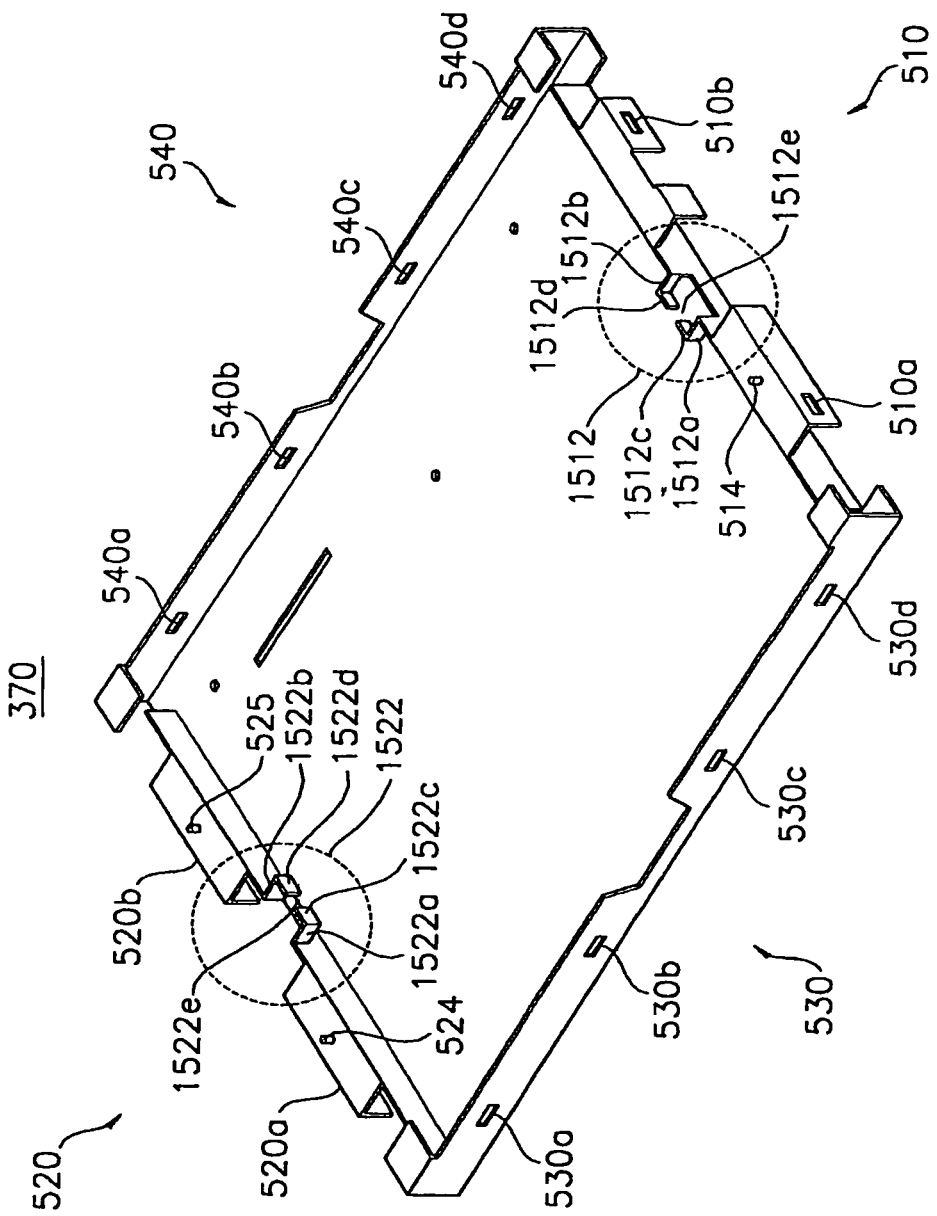
FIG. 18 is a perspective view showing a structure of a bottom chassis according to a third embodiment of the present invention.

FIG. 18 is a perspective view showing a structure of a bottom chassis according to a third embodiment of the present invention.

Referring to FIG. 18, the bottom chassis 370 includes a bottom surface and first to fourth sidewalls 510, 520, 530 and 540. The bottom chassis 370 includes a first supporting member 1512 and a second supporting member 1522 disposed on the first and second sidewalls 510 and 520, respectively. The first and second supporting members 1512 and 1522 are extended from the first and second sidewalls 510 and 520 to have a predetermined width corresponding to that of the first and second guide grooves 350a and 350b of the light guiding plate 350, respectively. The first and second supporting members 1512 and 1522 are respectively combined with the first and second guide grooves 350a and 350b of the light guiding plate 350 to prevent the light guiding plate 350 received in the bottom chassis 370 from being moved. Both of the first and second supporting members 1512 and 1522 may be formed in only one sidewall of the bottom chassis 370 or only one supporting member may be formed in one of the first or second sidewalls 510 and 520.

The first supporting member 1512 includes a first member 1512a inwardly extended from the first sidewall 510, a second member 1512b inwardly extended from the first sidewall 510, spacing apart from the first member 1512a, a third member 1512c extended from the first member 1512a toward the second member 1512b and parallel with the first sidewall 510 and a fourth member 1512d extended from the second member 1512b toward the first member 1512a and parallel with the first sidewall 510.

The second supporting member 1522 includes a fifth member 1522a inwardly extended from the second sidewall 520, a sixth member 1522b inwardly extended from the second sidewall 520, spacing apart from the fifth member 1522a, a seventh member 1522c extended from the fifth member 1522a toward the sixth member 1522b and parallel with the second sidewall 520 and an eighth member 1522d extended from the sixth member 1522b toward the fifth member 1522a and parallel with the second sidewall 520.

The first supporting member 1512 includes a first opening 1512e defined by the third and fourth members 1512c and 1512d and the second supporting member 1522 includes a second opening 1522e defined by the seventh and eighth members 1522c and 1522d. Thus, the bottom chassis 370 can be easily manufactured by an injection molding.

The bottom chassis 370 includes a plurality of engaging holes 510a, 510b, 520a, 520b, 530a, 530b, 530c, 530d, 540a, 540b, 540c and 540d in the first to fourth sidewalls 510, 520, 530 and 540.

The bottom chassis 370 includes a first fixing boss 514 disposed on the first sidewall 510, a second fixing boss 524 and a third fixing boss 525 disposed on the second sidewall 520. The first, second and third fixing bosses 514, 524 and 525 are coupled with the first, second and third fixing holes 342a, 344a and 346a of the first to third fixing portions 342, 344 and 346 of the optical sheet 340, respectively.

The optical sheet 340 is fixed to the receiving space of the bottom chassis 370 by combining the first to the third fixing bosses 514, 524 and 525 with the first to third fixing holes 342a, 344a and 346a. A number of fixing bosses disposed on the first sidewall 510 can be the same as or different from a number of fixing bosses disposed on the second sidewall 520. Hereinafter, a method for assembling the LCD apparatus according to the present invention will be described with reference to FIGS. 3 to 12.

The first and second lamp units 352 and 354 are inserted into the bottom chassis 370 through the openings of the first and second lamp insertion portions at the third and fourth sidewalls 530 and 540 of the bottom chassis 370, respectively.

The light guiding plate 350 is received in the receiving space of the bottom chassis 370 along with the reflecting plate 360. The reflecting plate 360 is partially adhered to an edge of the light guiding plate 350. The light guiding plate 350 is fixed to the bottom chassis 370 by combining the first and second supporting members 512 and 522 of the bottom chassis 370 with the first and second guide grooves 350a and 350b of the light guiding plate 350, respectively.

The optical sheet 340 is sequentially received on the bottom chassis 370 by engaging the first to third fixing bosses 514, 524 and 525 of the bottom chassis 370 into the first to third fixing holes 342a, 344a and 346a of the optical sheet 340, thereby preventing the optical sheet 340 from being moved.

The bottom chassis 370 includes an A/D board (not shown) and an inverter board (not shown) disposed on the rear surface of the bottom chassis 370.

The mold frame 330 is combined with the bottom chassis 370 to prevent the reflecting plate 360, the light guiding plate 350 and the optical sheet 340 from being deviated from the receiving space of the bottom chassis 370. Specifically, the mold frame 330 is combined with the bottom chassis 370 to cover an outer wall of the bottom chassis 370 by engaging the engaging projections 330i, 330j, 330k, 330l, 330d, 330c, 330b, 330a, 330h, 330g, 330f and 330e into the engaging holes 510a, 510b, 520a, 520b, 530a, 530b, 530c, 530d, 540a, 540b, 540c and 540d, respectively.

The display unit 320 is received on the mold frame 330, and the top chassis 310 is provided on the display unit 320 to fix the integrated PCB 325 and the gate TCP 323 to the rear surface of the bottom chassis 370 after bending and fixing the integrated PCB 325 and the gate TCP 323 on the outer wall of the mold frame 330. The integrated PCB 325 is covered by the PCB cover 700.

As shown in FIG. 3, the front case 200 is coupled to the rear case 400, so that an assembly of the LCD apparatus is completed.

According to the LCD apparatus, the bottom chassis receives the backlight assembly, so that a bottom mold frame for receiving the backlight assembly may be removed. Thus, it is able to reduce a manufacturing cost and a weight of the LCD apparatus.

Further, since heat generated from the lamp units is easily emitted to an external through the bottom chassis having a thermal conductivity higher than that of the bottom mold frame, it is able to prevent the image displayed through the LCD apparatus from being deteriorated.

Although the exemplary embodiments of the present invention have been described, it is understood that the present invention should not be limited to these exemplary embodiments but various changes and modifications can be made by one of ordinary skilled in the art without departing from the spirit and scope of the present invention as hereinafter claimed.

What is claimed is:

1. A backlight assembly comprising:
 a light generating unit generating light;
 a light guide plate guiding the light, the light guide plate defining a first guiding portion, the first guiding portion defined by the light guide plate including a recess inwardly protruded with respect to a first side of the light guide plate; and
 a receiving container defining a bottom surface thereof which extends to define a plurality of sidewalls thereof, the bottom surface and the sidewalls defining a receiving space,
 wherein
 a sidewall among the plurality of sidewalls defined by the extended bottom surface is bent to define a second guiding portion extended from an uppermost end of the sidewall such that a thickness of the sidewall which defines the second guiding portion is substantially the same as a thickness of the second guiding portion defined thereby, the second guiding portion defined by the extended sidewall is spaced apart from the bottom surface and includes a first protrusion spaced apart from the bottom surface and inwardly protruded toward the receiving space, and the first protrusion spaced apart from the bottom surface is coupled with the recess of the first guiding portion of the light guide plate and does not overlap the light guide plate at the recess thereof in a plan view.

2. The backlight assembly of claim 1, wherein
the first guiding portion defined by the light guide plate further comprises a first protrusion outwardly protruded with respect to the first side of the light guide plate, and the second guiding portion defined by the extended sidewall further comprises a second protrusion outwardly protruded with respect to the sidewall of the receiving container, the first protrusion of the first guiding portion coupled with the second protrusion of the second guiding portion.

3. The backlight assembly of claim 1, further comprising a mold frame coupled to the receiving container.

4. The backlight assembly of claim 3, wherein the mold frame includes a first engaging portion, and
the receiving container further includes a second engaging portion coupled to the first engaging portion.

5. The backlight assembly of claim 4, wherein the first engaging portion includes a protrusion,
the second engaging portion includes a hole coupled to the protrusion, and
the hole is formed on the sidewall of the receiving container.

6. The backlight assembly of claim 1, further comprising an optical sheet disposed on the light guide plate.

7. The backlight assembly of claim 6, wherein the optical sheet includes a first fixing portion, and
the receiving container further includes a second fixing portion coupled to the first fixing portion.

8. The backlight assembly of claim 7, wherein the first fixing portion includes a hole,
the second fixing portion includes a protrusion coupled to the hole, and
the protrusion is formed on an upper surface of the sidewall of the receiving container.

9. The backlight assembly of claim 7, wherein the first fixing portion is outwardly protruded with respect to a side of the light guide plate.

10. The backlight assembly of claim 1, wherein the receiving container comprises at least one of metal or metal alloy.

11. The backlight assembly of claim 1, wherein the second guiding portion is formed by bending a portion of the receiving container.

12. The backlight assembly of claim 11, further comprising a reflecting plate disposed between the light guide plate and the receiving container.

13. The backlight assembly of claim 12, wherein a portion of the second guiding portion has a height identical to a sum of a thickness of each of the light guide plate and the reflecting plate.

14. The backlight assembly of claim 1, wherein the light guide plate comprises a first side and a second side opposite to the first side and the first guiding portion is formed on the first side.

15. The backlight assembly of claim 14, further comprising another first guiding portion formed on the second side and another second guiding portion coupled with the first guiding portion formed on the second side.

16. The backlight assembly of claim 15, wherein a distance between the first guiding portions is shorter than a distance between the second guiding portions.

17. The backlight assembly of claim 1, wherein
the second guiding portion extends in an extension direction from the sidewall among the plurality of sidewalls extended from the bottom surface,
the sidewall among the plurality of sidewalls defined by the extended bottom surface extends in an extension direction from the bottom surface of the receiving container, and
the thickness of the second guiding portion is substantially the same as the thickness of the sidewall of the receiving container, the thicknesses defined in a direction normal to the extension directions of the second guiding portion and the sidewall, respectively.

18. The backlight assembly of claim 1, wherein
the second guiding portion extends in an extension direction from the sidewall among the plurality of sidewalls defined by the extended bottom surface,
the bottom surface extends in an extension direction, and
the thickness of the second guiding portion is substantially the same as the thickness of the bottom surface of the receiving container, the thicknesses defined in a direction normal to the extension directions of the second guiding portion and the bottom surface, respectively.

19. The backlight assembly of claim 1, wherein the bottom surface, the plurality of sidewalls and the second guiding portion of the receiving container each includes a conductive material and collectively form a single, unitary indivisible receiving container.

20. A display apparatus comprising:
a light generating unit generating light;
a light guide plate guiding the light, the light guide plate defining a first guiding portion, the first guiding portion defined by the light guide plate including a recess inwardly protruded with respect to a first side of the light guide plate;
a display unit receiving the light to display an image; and
a receiving container defining a bottom surface thereof which extends to define a plurality of sidewalls thereof, the bottom surface and the sidewalls defining a receiving space,
wherein
a sidewall among the plurality of sidewalls defined by the extended bottom surface is bent to define a second guiding portion extended from an uppermost end of the sidewall such that a thickness of the sidewall which defines the second guiding portion is substantially the same as a thickness of the second guiding portion defined thereby,
the second guiding portion defined by the extended sidewall is spaced apart from the bottom surface and includes a first protrusion spaced apart from the bottom surface and inwardly protruded toward the receiving space, and
the first protrusion spaced apart from the bottom surface is coupled with the recess of the first guiding portion of the light guide plate and does not overlap the light guide plate at the recess thereof in a plan view.

21. The display apparatus of claim 20, wherein the display unit includes:
a display panel displaying the image; and
a printed circuit board electrically connected to the display panel.

22. The display apparatus of claim 21, wherein the receiving container further includes a printed circuit board supporter protruded from a rear surface of the receiving container to support the printed circuit board.

23. The display apparatus of claim 22, further comprising a printed circuit board cover disposed under the receiving container to cover the printed circuit board.

24. The display apparatus of claim 21, wherein the printed circuit board is grounded to the receiving container.

25. The display apparatus of claim 24, wherein the printed circuit board is disposed below a rear surface of the bottom chassis.

26. The display apparatus of claim 20, wherein the receiving container comprises at least one of metal or metal alloy.

27. The display apparatus of claim 20, wherein the second guiding portion is formed by bending a portion of the receiving container.

28. The display apparatus of claim 27, further comprising a reflecting plate disposed between the light guide plate and the receiving container.

29. The display apparatus of claim 28, wherein a portion of the second guiding portion has a height identical to a sum of a thickness of each of the light guide plate and the reflecting plate.

30. The display apparatus of claim 20, wherein the light guide plate comprises a first side and a second side opposite to the first side and the first guiding portion is formed on the first side.

31. The display apparatus of claim 30, further comprising another first guiding portion formed on the second side and another second guiding portion coupled with the first guiding portion formed on the second side.

32. The display apparatus of claim 31, wherein a distance between the first guiding portions is shorter than a distance between the second guiding portions.

33. The display apparatus of claim 20, further comprising a mold frame coupled to the receiving container.

34. The display apparatus of claim 33, wherein the mold frame is disposed between a side portion of the display panel and the receiving container.

35. The display apparatus of claim 20, wherein
the second guiding portion extends in an extension direction from the sidewall among the plurality of sidewalls defined by the extended bottom surface,
the sidewall among the plurality of sidewalls defined by the extended bottom surface extends in an extension direction from the bottom surface of the receiving container, and
the thickness of the second guiding portion is substantially the same as the thickness of the sidewall of the receiving container, the thicknesses defined in a direction normal to the extension directions of the second guiding portion and the sidewall, respectively.

36. The display apparatus of claim 20, wherein
the second guiding portion extends in an extension direction from the sidewall among the plurality of sidewalls defined by the extended bottom surface,
the bottom surface extends in an extension direction, and
the thickness of the second guiding portion is substantially the same as the thickness of the bottom surface of the receiving container, the thicknesses defined in a direction normal to the extension directions of the second guiding portion and the bottom surface, respectively.

37. The display apparatus of claim 20, wherein the bottom surface, the plurality of sidewalls and the second guiding portion of the receiving container each includes a conductive material and collectively form a single, unitary indivisible receiving container.

38. A backlight assembly comprising:
a light generating unit generating light;
a light guide plate guiding the light, the light guide plate including a first guiding portion; and
a receiving container including a bottom surface, a plurality of sidewalls each extended from the bottom surface, and a second guiding portion extended from a first sidewall among the plurality of sidewalls and coupled with the first guiding portion of the light guide plate, the bottom surface and the sidewalls defining a receiving space,
wherein
the first guiding portion comprises a recess inwardly protruded with respect to a first side of the light guide plate, and
the first sidewall defines along a length thereof:
a first portion thereof extended from the bottom surface to a first height to define a first maximum height of the first sidewall, and
a second portion thereof which is adjacent and continuously connected to the first portion, the second portion extended from the bottom surface to a second height which is smaller than the first height to define a second maximum height of the first sidewall,
wherein
the first maximum height and the second maximum height of the first sidewall alternate along the length of the first sidewall, and
the second portion at the second height protrudes inwardly toward the receiving space to define the second guiding portion such than an upper surface of the second guiding portion is lower than the first maximum height of the first sidewall at the first portion thereof.

39. The backlight assembly of claim 38, wherein the second guiding portion does not overlap the light guide plate in a plan view.

* * * * *